(12) United States Patent
Cordaro

(10) Patent No.: US 6,480,366 B1
(45) Date of Patent: Nov. 12, 2002

(54) ELECTRIC POWER SYSTEM WITH PAINTED-CAPACITOR ENERGY STORAGE, AND ITS FABRICATION

(75) Inventor: James F. Cordaro, Ridgecrest, CA (US)

(73) Assignee: The Boeing Company, Seattle, WA (US)

( * ) Notice: Subject to any disclaimer, the term of this patent is extended or adjusted under 35 U.S.C. 154(b) by 15 days.

(21) Appl. No.: 09/844,406

(22) Filed: Apr. 27, 2001

(51) Int. Cl.[7] .............................. H01G 2/12; H01G 2/14
(52) U.S. Cl. ........................................................ 361/15
(58) Field of Search ........................ 361/15, 305, 312, 361/321.1, 321.4, 321.6, 321.5

(56) References Cited

U.S. PATENT DOCUMENTS

| | | | |
|---|---|---|---|
| 3,651,386 A | * | 3/1972 | Youtsey et al. |
| 4,018,943 A | * | 4/1977 | Youtsey et al. |
| 4,365,106 A | | 12/1982 | Pulvari |
| 5,094,693 A | | 3/1992 | Cordaro et al. |
| 5,537,048 A | * | 7/1996 | Novak |
| 5,807,909 A | | 9/1998 | Cordaro et al. |
| 5,820,669 A | | 10/1998 | Cordaro |
| 6,027,075 A | | 2/2000 | Petrenko |
| 6,099,637 A | | 8/2000 | Cordaro |
| 6,124,378 A | | 9/2000 | Cordaro |

OTHER PUBLICATIONS

Egusa et al., "Piezoelectric paints as one approach to smart structural materials with health–monitoring capabilities," *Smart Materials*, vol. 7 (1998), pp. 438–445.

* cited by examiner

*Primary Examiner*—Edward H. Tso
(74) *Attorney, Agent, or Firm*—John R. Rafter; Terje Gudmestad

(57) ABSTRACT

An electric power system includes a layered semiconductor photovoltaic voltage source, and an electrical conductor structure having two electrically conductive contacts to the voltage source structure. A capacitor is in electrical communication with one of the electrically conductive contacts. The capacitor includes a capacitive paint layer structure comprising capacitive pigment particles dispersed in a capacitive layer binder. A first side of the capacitive paint layer structure is deposited in facing contact to the second electrically conductive contact. A capacitor electrically conductive contact is in electrical communication with a second side of the capacitive paint layer structure remote from the first side.

16 Claims, 2 Drawing Sheets

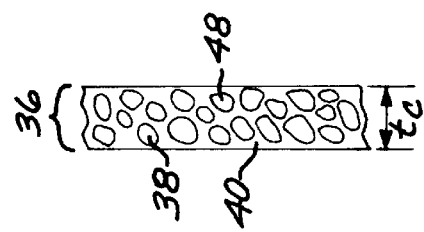
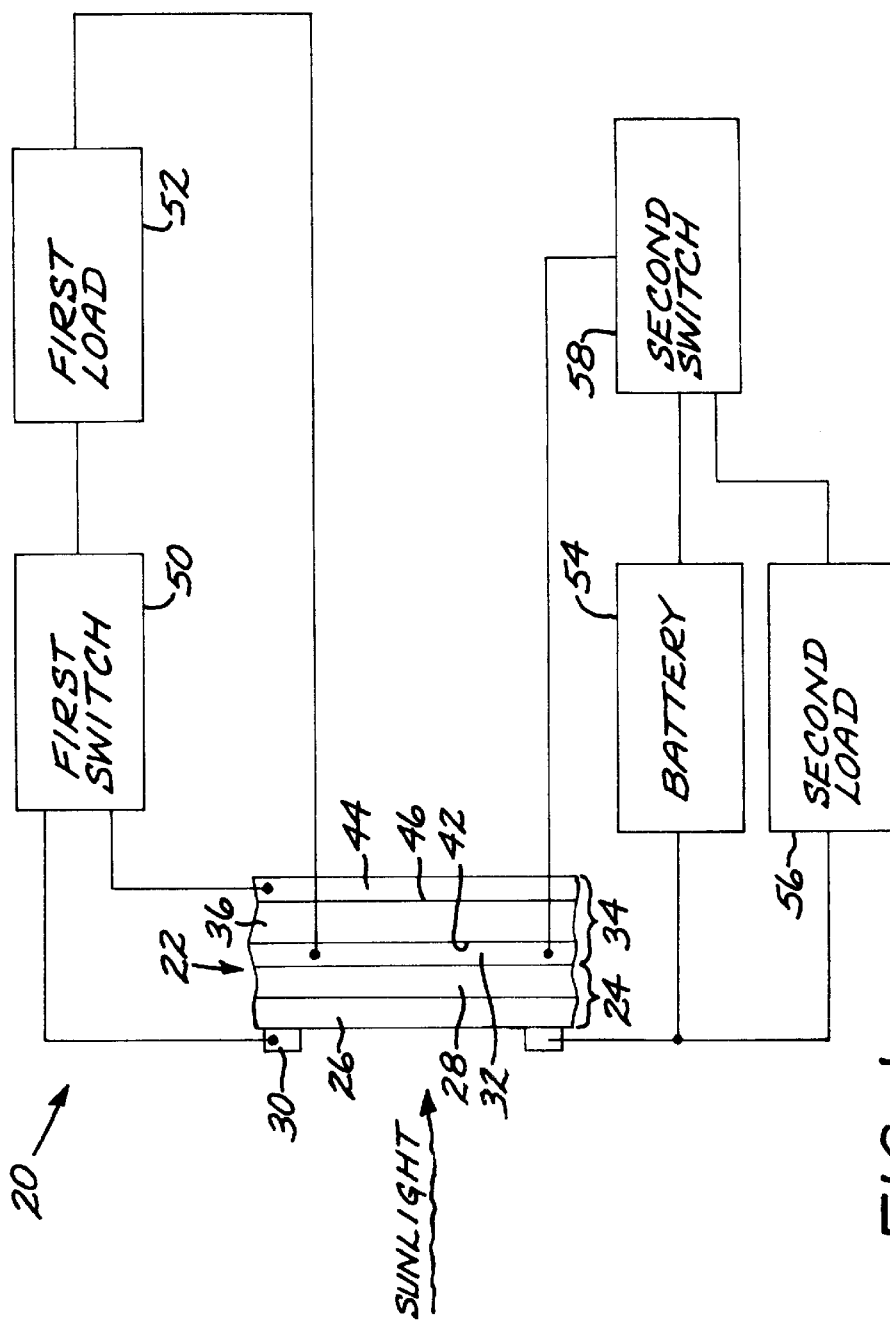
FIG.1
FIG.2

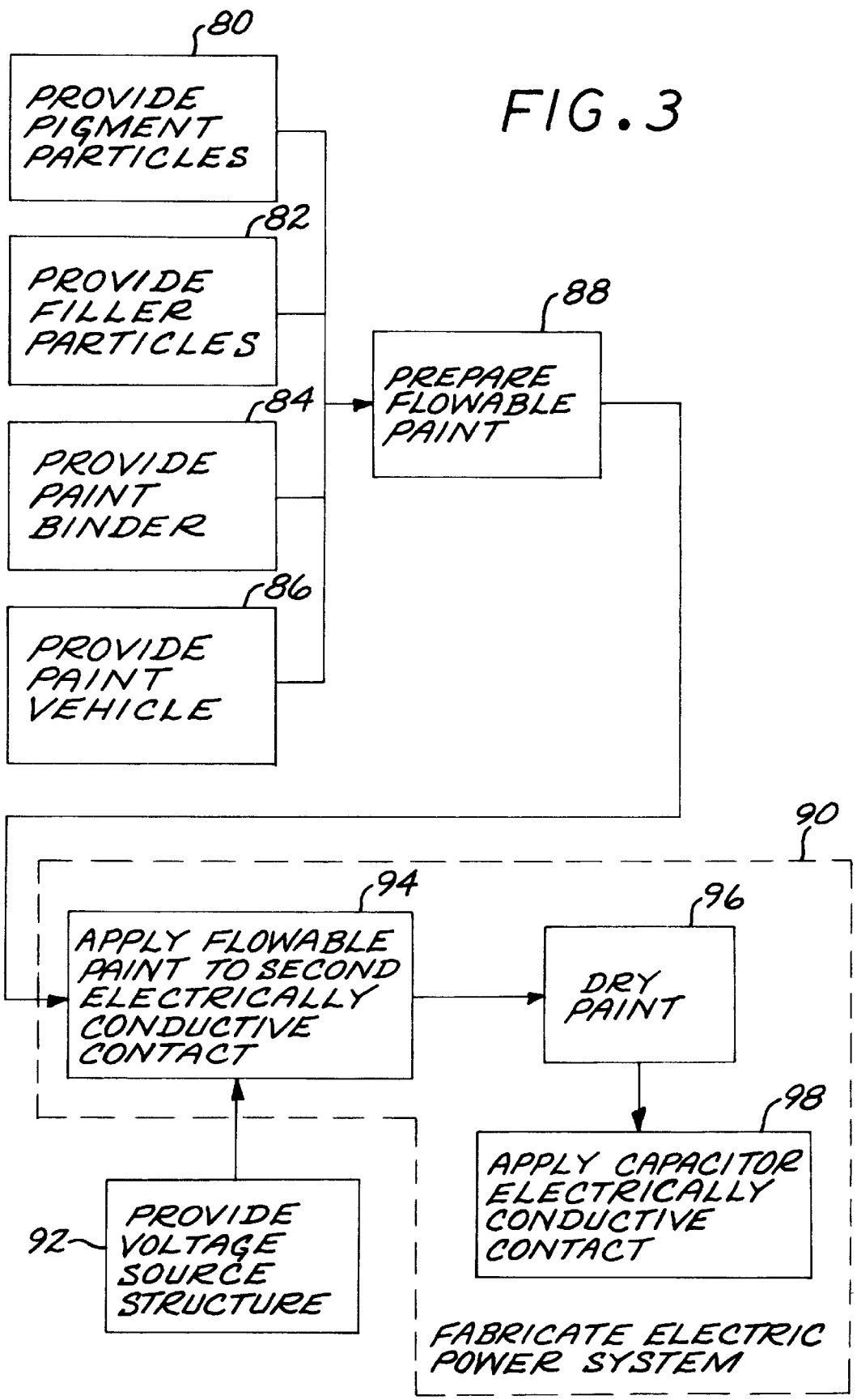

ELECTRIC POWER SYSTEM WITH PAINTED-CAPACITOR ENERGY STORAGE, AND ITS FABRICATION

This invention relates to electric power systems and, more particularly, to a solar electric system having capacitive energy storage in a painted layer.

BACKGROUND OF THE INVENTION

Solar energy is generated in space and terrestrial applications by a solar electric system that includes a solar cell which generates power, an energy storage device in the form of a battery system, and appropriate electrical connections to the load. The batteries are typically required because solar energy generation by the solar cell is intermittent and subject to interruptions due to periods of eclipse and spacecraft orientation in space applications, and clouds and nightfall in terrestrial applications. The solar cell generates power when it is in sunlight. Some of the power is used immediately and the remainder charges the batteries. When the solar cell is not producing an output or extra energy is needed in addition to the current production of the solar cell, the power is supplied by the discharging of the batteries.

The battery system ordinarily includes a number of batteries interconnected appropriately to provide the required voltage and current output. The batteries available today are, despite extensive research and development, relatively bulky and heavy. The batteries for use in space applications must be designed for high reliability to meet spacecraft design lives, which may be 15 years or longer for geosynchronous communications satellites. The individual batteries are nevertheless subject to failure and eventual exhaustion, and to operational and regulation problems. The battery system therefore includes circuitry for monitoring and carefully controlling the batteries, and for bypassing batteries that fail during service. The battery system used for energy storage in the solar electrical system, which includes both the batteries themselves and their monitoring and control circuitry, is bulky, heavy, and complex.

There is an ongoing need for an improved approach to energy storage in solar electric systems. The present invention fulfills this need, and further provides related advantages.

SUMMARY OF THE INVENTION

The present invention provides an electric power system in which energy storage is provided in whole or in part by a paint capacitor. The capacitor is preferably integral with a voltage source such as a solar cell, or it may be separate from the voltage source. The capacitor is inexpensive to fabricate, and it is light in weight, adds little volume, and is robust. The capacitor may be designed to completely replace the batteries or, more typically, supplements the energy storage in the batteries so that the required size and weight of the batteries may be reduced. The preferred application of the paint capacitive energy storage is with a solar cell, but it may be used with other types of voltage sources as well.

In accordance with the invention, an electric power system comprises a voltage source structure of any operable type, but preferably a solar cell; an electrical conductor structure comprising a first electrically conductive contact to the voltage source structure and a second electrically conductive contact to the voltage source structure; and a capacitor in electrical communication with the second electrically conductive contact. The capacitor includes a capacitive paint layer structure comprising capacitive pigment particles, preferably pyroelectric/ferroelectric pigment particles, dispersed in a capacitive layer binder. Most preferably, the pyroelectric/ferroelectric pigment particles are ferroelectric pigment particles. The binder may be inorganic or organic. The capacitive paint layer structure may further include filler particles. A first side of the capacitive paint layer structure is in electrical communication with the second electrically conductive contact, and preferably is painted upon the second electrically conductive contact. The capacitor further includes a capacitor electrically conductive contact in electrical communication with a second side of the capacitive paint layer structure remote from the first side. A battery may be electrically interconnected with the capacitor.

The electric power system is prepared by providing a voltage source structure having a first electrically conductive contact and a second electrically conductive contact, and preparing a flowable capacitive paint comprising pyroelectric/ferroelectric pigment particles, a capacitive layer binder, and a capacitive layer vehicle. The electric power system is fabricated by applying a layer of the flowable capacitive paint to the second electrically conductive contact, drying the flowable capacitive paint to form a capacitive paint layer structure having a first side of the capacitive paint layer structure in electrical communication with the second electrically conductive contact and a second side remote from the first side, and applying a capacitor electrically conductive contact to the second side of the capacitive paint layer structure.

The capacitive paint stores electrical energy generated by the voltage source structure and may be later discharged through the load when the electrical energy is needed. The capacitive paint allows the heavy, expensive electrical storage batteries to be reduced in number and size, or eliminated completely from the electrical system.

The paint capacitor is ideally suited for use with solar cells and other types of voltage source structures that require a relatively large area for the production of electric power. The paint capacitor is applied as a layer to the back side of the solar cell away from the sun-facing side. The back side of the solar cell otherwise has only the function of providing one of the electrical contacts to the solar cell voltage source.

The present invention provides a major advance in the art of electrical power sources and particularly in regard to solar cells and photovoltaic generation of electrical power. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic view of an electric power system made according to the invention;

FIG. 2 is a schematic view of the capacitive paint layer structure; and

FIG. 3 is a block flow diagram of an approach for preparing a solar cell with capacitive energy storage.

DETAILED DESCRIPTION OF THE INVENTION

FIG. 1 illustrates an electric power system 20. The electric power system 20 includes a voltage source structure 22 that produces a voltage output. The preferred voltage source structure 22 is a solar cell 24 in the form of a photovoltaic voltage source, which will be described in detail, but the invention is not so limited and may be used with other types of voltage source structures 22. The solar cell 24 is a layered semiconductor structure having a p-type layer 26 in contact with an n-type layer 28. (As used herein, reference to "p-type" indicates a p-type semiconductor material, and reference to "n-type" indicates an n-type semiconductor material.) The p-type layer 26 may be p-type silicon and the ntype layer 28 may be n-type silicon, for example, but the present approach is not so limited. There is a first electrically conductive contact 30 to the voltage source structure 22, in this case to the p-type layer 26 of the solar cell 24. There is a second electrically conductive contact 32 to the voltage source structure 22, in this case to the n-type layer 28 of the solar cell 24. The first electrically conductive contact 30 is illustrated as a front-side grid or mesh that allows sunlight to pass through to the p-type layer 26. The second electrically conductive contact 32 is illustrated as a back-side solid sheet or film. The electrically conductive contacts may be of any operable conductive material or form, such as aluminum, gold, or the like. There are many different solar cell materials of construction and configurations designed to improve solar efficiency. The present approach may be used with any compatible solar cell. The present approach is not concerned with the production of the voltage and charge, but instead with storage of the electrical charge.

A capacitor 34 comprises a capacitive paint layer structure 36, which in turn comprises capacitive pigment particles 38 dispersed in a capacitive layer binder 40 as shown in greater detail in FIG. 2. Preferably, a first side 42 of the capacitive paint layer structure 36 is in electrical communication with the second electrically conductive contact 32. Most preferably, the first side 42 of the capacitive paint layer structure 36 is painted upon and in facing contact with the second electrically conductive contact 32. A capacitor electrically conductive contact 44 is in electrical communication with a second side 46 of the capacitive paint layer 36 structure remote from the first side 42. The capacitive paint layer structure may include multiple layers of the paint alternating with layers of an intermediate dielectric material to form a multilayer capacitor, positioned between the second electrically conductive contact 32 and the capacitor electrically conductive contact 44.

The capacitive paint layer structure 36 is a "paint". A paint is defined as a mixture comprising solid pigment particles, and optionally other particles such as filler particles, dispersed throughout a binder. Additives to aid in flow modification and impart other properties to the paint may also be present. The paint is initially in a flowable form with the solid particles in the flowable binder and usually with a flowable paint vehicle (such as a solvent for the binder) present to increase the flowability of the paint and thereby aid in the application of the flowable paint. The paint is applied in this flowable form and thereafter dries to a solid form with the solid particles in a solid binder. The application of the paint and the drying are typically in air at room temperature, although the paint may be heated slightly to accelerate the drying and to cure the binder where the binder is a curable material. The paint vehicle is lost, typically by evaporation, in the drying process. The paints of the present invention are provided in flowable form, are applied in a manner comparable with conventional paints, and dry in the manner of paints.

The capacitive pigment particles 38 are made of a material that stores electrical energy therein. The capacitive pigment particles 38 are preferably a pyroelectric/ferroelectric material, which exhibits this energy storage property. The capacitive pigment particles 38 may be made of a pyroelectric material that is not a ferroelectric material, a pyroelectric material that is a ferroelectric material, or mixtures of both. Mixtures of different compositions of pyroelectric/ferroelectric pigment particles may also be used as the pigment particles 38. The use of mixtures of different types of pyroelectric/ferroelectric pigment particles 38 allows the capacitive performance of the capacitive paint layer structure 36 to be tuned to its specific requirements. The capacitive pigment particles 38 may be of any operable morphology and size, but typically are generally equiaxed particles from about 0.1 to about 10 micrometers in dimension.

The nature of the pyroelectric/ferroelectric pigment particles 36 may be understood in greater detail by reference to their crystallographic structures. All crystals may be placed into one of 32 symmetry point groups as presently known by crystallographers. These 32 point groups are subdivisions of the well-known seven basic crystal systems: cubic, hexagonal, rhombohedral, tetragonal, orthorhombic, monoclinic, and triclinic. Twenty-one of the 32 groups are noncentrosymmetric, in that the point group lacks a center of symmetry. A lack of a center of symmetry is necessary for the crystal to exhibit the phenomenon of piezoelectricity, whereby a homogeneous stress upon the crystal produces a net movement of positive and negative ions with respect to each other, resulting in an electric dipole moment and thus polarization. Twenty of these 21 noncentrosymmetric point groups exhibit piezoelectricity. Of the 20 point groups which exhibit piezoelectricity, 10 are known to be pyroelectric (sometimes called polar). A pyroelectric crystal has the additional characteristic of becoming spontaneously polarized and forming permanent dipole moments within a given temperature range. Non-ferroelectric pigment materials which lie within the 10 pyroelectric point groups are operable with this invention, but are not preferred because their polarization effects are relatively small. The 10 pyroelectric (or polar) point groups are (in Schoenflies notation): $C_1$, $C_2$, $C_S$ or $C_{1h}$, $C_{2V}$, $C_4$, $D_4$, $C_3$, $C_{3V}$, $C_6$, and $C_{6V}$. An included (noncentrosymmetric point group) material class is the antiferroelectrics, which are polar at the level of the crystallographic unit cell but do not have an apparent macroscopic polarization.

A special subgroup of the 10 pyroelectric point groups is known as ferroelectrics, which, with the appropriate doping, are the preferred materials for use as the pigment in the present invention. The ferroelectric material is distinguishable from the pyroelectric material in that the polarization is reversible by an electrical field of magnitude of less than the dielectric breakdown strength of the crystal itself, a condition which is not present in a material designated as exhibiting pyroelectricity alone. The preferred ferroelectric materials are thus characterized by both a spontaneous polarization resulting in permanent dipoles within a given temperature range and the characteristic of the ability to reorient the polarization by an externally applied electric field.

The preferred capacitive pigment particles 38 are therefore described as "pyroelectric/ferroelectric", a term of art used herein to mean that they are a pyroelectric material but are preferably within the subgroup of the ferroelectric materials. Because the ferroelectric materials represent the preferred embodiment, the following discussion will focus on ferroelectric materials with the understanding that materials which are pyroelectric but not ferroelectric may also be used.

There are many ferroelectric crystals and ceramic solid solutions which are operable within the scope of this invention. Of the ferroelectric subgroup of the 10 pyroelectric point groups, several are of particular importance. These include the tungsten bronze structure (for example, $PbNb_2O_6$), the oxygen octahedral structure (generalized by example $ABO_3$), the pyrochlore structure (for example, $Cd_2Nb_2O_7$), and layer structures (for example, $Bi_4Ti_3O_{12}$). Of further importance within the oxygen octahedral structures are the ceramic perovskites which are of particular importance to this invention. The perovskites include, by way of example, barium titanate $BaTiO_3$ along with its various solid solutions such as BST (barium strontium titanates), PZT (lead zirconate titanates), PLZT (lead lanthanum zirconate titanates), PT (lead titanates), PMN (lead magnesium niobates), and sodium-potassium niobates (Na, K)$NbO_3$. Other operable ferroelectrics include PZN (lead zinc niobates), PSZT (lead stannate zirconate titanates), PZ (lead zirconates), and SBT (strontium bismuth titanates). Many other ferroelectric materials are known and may be used in relation to the present invention. Examples include $BaTiO_3$ mixed with $MgSnO_3$, $SrTiO_3$ mixed with $CaTiO_3$, $CaSnO_3$ mixed with CaO, $CaZrO_3$, $CaSnO_3$, and $Bi_2(SnO_3)_3$. Relaxor ferroelectric material systems such as $Pb(Mg_{1/3}Nb_{2/3})O_3$—$PbTiO_3$—$Ba(Zn_{1/3}Nb_{2/3})O_3$ are additional examples of operable ferroelectrics. These materials are given only by way of example to define the scope of the operable materials using crystal structure, and the invention is not limited to these materials.

Filler particles 48 may also be present. The filler particles 48 enter into the capacitive storage process only weakly, if at all. Instead, their main function is to add bulk and flow consistency, as well as other physical properties, to the capacitive paint layer structure 36. Examples of operable filler particles 48 include $SiO_2$ and $Al_2O_3$. The filler particles 48 may be of any operable morphology and size, but typically are generally equiaxed particles from about 0.1 to about 10 micrometers in dimension.

The capacitive paint layer structure 36 further includes a binder 40. The binder 40 serves as a matrix in which the particles 38 and 48 are embedded and dispersed, and thence as an insulating medium. The binder 40 also serves to adhere the capacitive paint layer structure 36 to the second electrically conductive contact 32 and to the capacitor electrically conductive contact 44, which together serve as the capacitor plates. The binder 40 may be an organic binder or an inorganic binder. Examples of operable organic binders include cross-linked and polymerized dimethyl silicone copolymer, silicone-modified epoxy, polyurethane, poly(dimethyl-siloxane), poly(dimethylsiloxane-co-methylphenylsiloxane), polyimide, and polyamide. An example of an operable inorganic binder is potassium silicate.

The capacitive pigment particles 38 are preferably present in an amount of from about 50 to about 80 percent by volume of the capacitive paint layer structure 36.

The capacitive paint layer structure 36 may be of any operable thickness $t_c$, but is typically from about 0.0005 to about 0.0015 inch thickness.

As electrical energy is produced by the voltage source structure 22, some is used externally and some is stored in the capacitor 34 for subsequent use. A large number of different types of external circuits are possible, and FIG. 1 illustrates one such external circuit by way of example and not of limitation. Externally to the paint solar cell 20, a first switch 50 has its output one of two switchable inputs that are in electrical communication with the first electrically conductive contact 30 and with the capacitor electrically conductive contact 44. A first load 52 is connected in series with the output of the switch 50 and the second electrically conductive contact 32. When the first switch 50 is operated to select as its input the first electrically conductive contact 30, the first load 52 is powered from the direct output of the voltage source structure 22, and any excess electrical energy charges the capacitive paint layer structure 36. When the first switch 50 is operated to select as its input the capacitor electrically conductive contact 44, the first load 52 is powered by the energy that is discharged from the capacitive paint layer structure 36. The energy storage of the capacitive paint layer structure 36 may be selected to be sufficient to all of the power for the first load 52 when the voltage source structure 22 cannot produce power (i.e., during periods of eclipse). Alternatively, batteries may be provided to supply some of the power to the first load 52.

The present approach is fully compatible with the optional use of batteries to store some of the excess electrical energy produced by the voltage source structure 22. FIG. 1 illustrates one such use of batteries by way of example, but the invention is not so limited. In this case, a battery 54 is connected in parallel with a second load 56 between the first electrically conductive contact 30 and the second electrically conductive contact 32. A second switch 58 controls the current path to and from the battery 54 and the second load 56. The second switch 58 is configured to allow electrical energy produced by the voltage source structure 22 to be consumed by the second load 56 or stored in the battery 54, or for electrical energy stored in the battery 54 to be consumed by the second load 56.

FIG. 3 depicts an approach for practicing the invention. The pigment particles 38 are provided, numeral 80; the optional filler particles 48 (if any) are provided, numeral 82; the capacitive layer binder 40 is provided in a flowable form, numeral 84; and a sufficient amount of the paint vehicle is provided, numeral 86, to allow the application of the flowable capacitive paint. The paint vehicle is selected to impart fluidity. The paint vehicle may be a flowable inorganic material such as water or a flowable organic material such as xylene, VM&P naphtha, methyl ethyl ketone (MEK), or methyl isobutyl ketone (MIBK). The amount of the paint vehicle is selected appropriately for the application technique—more of the paint vehicle is used for spraying than for brushing or a drawdown technique, for example.

The pigment particles 38, the filler particles 48 (if any), the capacitive binder 40, and the paint vehicle are mixed together to prepare the flowable capacitive paint, numeral 88. The procedures to prepare the capacitive paints are like those discussed in U.S. Pat. No. 6,099,637 and 6,124,378, whose disclosures are incorporated by reference in their entireties.

The electric power system 20 is fabricated, numeral 90, using the flowable paint prepared in step 88. To perform the fabrication, the voltage source structure 22 with its electrically conductive contacts 30 and 32 is provided, numeral 92. The flowable paint of step 88 is applied to the exposed surface of the second electrically conductive contact 32, numeral 94. Any operable application technique may be used, with spraying preferred. Other application techniques include, for example, drawdown, brushing, spin coating, rolling, dipping, or drawdown.

The applied flowable paint is dried, numeral 96, by removal of the paint vehicle. The removal is typically accomplished by evaporation at room temperature or at a slightly elevated temperature. The capacitive layer binder 40 may be cured during this drying step 96, particularly where the capacitive layer binder 40 is an organic material. The result of the drying step 96 is the solid capacitive paint layer structure 36 in the form of the paint film on the second electrically conductive contact 32.

The capacitor electrically conductive contact 44 is applied to the second side 46 of the capacitive paint layer structure 36, numeral 98. The capacitor electrically conductive contact is preferably supplied as a flowable mixture of electrically conductive particles in a binder and a vehicle, painted onto the second side 46 of the capacitive paint layer structure 36, and dried.

The completed structure is wired into the external circuitry.

The present invention has been reduced to practice and found operable. A solar cell was prepared in a p-over-n configuration with a p-type layer 26 overlying an n-type layer 28, a front-side first electrically conductive contact 30, and a back-side second electrically conductive contact 32 in the form of a sheet of 6061-T6 aluminum about 0.032 inch thick. A capacitive paint layer structure 36 of $BaTiO_3$ particles in a silicone binder was prepared and applied to the exposed side of the second electrically conductive contact 32 remote from the n-type layer 28, and partially dried. A capacitor electrically conductive contact 44 was painted onto the exposed side of the capacitive paint layer structure 36 remote from the second electrically conductive contact 32, using colloidal silver in a fluoroelastomer resin. The structure was dried, resulting in a solar cell like that of FIG. 1. When a light was directed toward the first paint layer side of the resulting structure, a voltage resulted between the contacts 30 and 32 and a current flow was observed. After the light was turned off, a slowly decreasing voltage was observed to remain between the contacts 32 and 44 and a current flow was measured, indicating that there had been energy storage in the capacitive paint layer structure 36.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An electric power system comprising
    a voltage source structure;
    an electrical conductor structure comprising a first electrically conductive contact to the voltage source structure and a second electrically conductive contact to the voltage source structure; and
    a capacitor in electrical communication with the second electrically conductive contact, the capacitor comprising
        a capacitive paint layer structure comprising pyroelectric/ferroelectric pigment particles dispersed in a capacitive layer binder, a first side of the capacitive paint layer structure being in electrical communication with the second electrically conductive contact, and
        a capacitor electrically conductive contact in electrical communication with a second side of the capacitive paint layer structure remote from the first side.

2. The electric power system of claim 1, wherein the voltage source structure comprises a photovoltaic voltage source.

3. The electric power system of claim 1, wherein the voltage source comprises a layer comprising a p-type semiconductor material in contact with a layer comprising an n-type semiconductor material.

4. The electric power system of claim 1, wherein the capacitive paint layer structure is painted upon and in facing contact with the second electrically conductive contact.

5. The electric power system of claim 1, further including a battery electrically interconnected with the capacitor.

6. The electric power system of claim 1, wherein the pyroelectric/ferroelectric pigment particles are ferroelectric pigment particles.

7. The electric power system of claim 1, wherein the capacitive layer binder is an organic material.

8. The electric power system of claim 1, wherein the capacitive layer binder is an inorganic material.

9. The electric power system of claim 1, wherein the capacitive paint layer structure further comprises a filler particle.

10. The electric power system of claim 1, wherein the voltage source structure comprises two layers of different semiconductor materials.

11. The electric power system of claim 1, wherein the capacitive paint layer structure has a thickness of from about 0.0005 to about 0.0015 inch.

12. The electric power system of claim 1, wherein the pyroelectric/ferroelectric pigment particles are present in an amount of from about 50 to about 80 percent by volume of the capacitive paint layer structure.

13. The electric power system of claim 1, wherein the pyroelectric/ferroelectric pigment particles are selected from the group consisting of a tungsten bronze structure, an oxygen octahedral structure, a pyrochlore structure (for example, a layer structure, a ceramic perovskites, a niobate, a titanate, and a relaxor ferroelectric material.

14. An electric power system comprising
    a voltage source structure;
    an electrical conductor structure comprising a first electrically conductive contact to the voltage source structure and a second electrically conductive contact to the voltage source structure; and
    a capacitor in electrical communication with the second electrically conductive contact, the capacitor comprising
        a capacitive paint layer structure comprising capacitive pigment particles dispersed in a capacitive layer binder, a first side of the capacitive paint layer structure being in electrical communication with the second electrically conductive contact, and
        a capacitor electrically conductive contact in electrical communication with a second side of the capacitive paint layer structure remote from the first side.

15. The electric power system of claim 14, wherein the voltage source structure comprises
    a layered semiconductor solar cell voltage source.

16. A method for preparing an electric power system, comprising the steps of
    preparing a flowable capacitive paint comprising pyroelectric/ferroelectric pigment particles, a capacitive layer binder, and a capacitive layer vehicle;
    providing a voltage source structure having a first electrically conductive contact and a second electrically conductive contact;
    fabricating the electric power system by
        applying a layer of the flowable capacitive paint to the second electrically conductive contact,
        drying the flowable capacitive paint to form a capacitive paint layer structure having a first side of the capacitive paint layer structure in electrical communication with the second electrically conductive contact and a second side remote from the first side, and applying a capacitor electrically conductive contact to the second side of the capacitive paint layer structure.

* * * * *